United States Patent
Kim et al.

(10) Patent No.: US 7,939,189 B2
(45) Date of Patent: May 10, 2011

(54) NO-WELDING TYPE BATTERY PACK

(75) Inventors: Jung-hwan Kim, Seoul (KR); Ki eob Moon, Seoul (KR); Seogjin Yoon, Seoul (KR); Cheol Woong Lee, Seoul (KR)

(73) Assignee: LG Chem, Ltd. (KR)

( * ) Notice: Subject to any disclaimer, the term of this patent is extended or adjusted under 35 U.S.C. 154(b) by 996 days.

(21) Appl. No.: 11/493,681

(22) Filed: Jul. 26, 2006

(65) Prior Publication Data

US 2007/0188132 A1 Aug. 16, 2007

(30) Foreign Application Priority Data

Oct. 21, 2005 (KR) .................. 10-2005-0099903

(51) Int. Cl.
*H01M 14/00* (2006.01)
*H01M 2/00* (2006.01)
*H01M 2/08* (2006.01)
*H01M 2/02* (2006.01)

(52) U.S. Cl. .............. 429/7; 429/61; 429/175; 429/177; 429/178; 429/180

(58) Field of Classification Search .............. 429/61, 429/175, 177, 178, 180, 7
See application file for complete search history.

(56) References Cited

U.S. PATENT DOCUMENTS

2003/0180582 A1* 9/2003 Masumoto et al. ............. 429/7
2005/0122667 A1* 6/2005 Moon ......................... 361/600

FOREIGN PATENT DOCUMENTS

KR 1020040015314 2/2004
KR 1020050081175 8/2005

* cited by examiner

*Primary Examiner* — Gregg Cantelmo
*Assistant Examiner* — Eugenia Wang
(74) *Attorney, Agent, or Firm* — Cantor Colburn LLP

(57) ABSTRACT

Disclosed herein is a battery pack, which comprises a connecting member including an insulation frame mounted to the upper end of a battery cell and a pair of connection protrusions formed at the upper end surface of the frame, the connection protrusions being in contact with electrode terminals of the battery cell, a protection circuit module (PCM) mounted to the connecting member, the PCM including connection grooves, into which the connection protrusions are inserted such that the PCM can be coupled to the connecting member, and which are connected to a protection circuit, and a cap housing coupled to the connecting member or the battery cell while the PCM is surrounded by the cap housing.

6 Claims, 3 Drawing Sheets

NO-WELDING TYPE BATTERY PACK

FIELD OF THE INVENTION

The present invention relates to a no-welding type battery pack, and, more particularly, to a battery pack, which comprises a connecting member including a pair of connection protrusions, a protection circuit module (PCM) including connection grooves, into which the connection protrusions are inserted such that the PCM can be coupled to the connecting member, and which are connected to a protection circuit, and a cap housing coupled to the connecting member or the battery cell while the PCM is surrounded by the cap housing.

BACKGROUND OF THE INVENTION

As mobile devices have been increasingly developed, and the demand of such mobile devices has increased, the demand of secondary batteries has also sharply increased as an energy source for the mobile devices. One of the secondary batteries is a lithium secondary battery having high energy density, high operation voltage, and excellent storage and service life characteristics, which is now widely used as an energy source for various electronic products as well as various kinds of mobile devices However, various combustible materials are contained in the lithium secondary battery. As a result, there is a possibility of danger in that the lithium secondary battery can be heated or exploded due to overcharge, overcurrent, or any other external physical impacts. In other words, the lithium secondary battery has low safety. Consequently, a protection circuit module (PCM) for effectively controlling the abnormality of the battery, such as overcharge, is mounted in the lithium secondary battery while the PCM is connected to a battery cell of the lithium secondary battery.

The PCM includes a field effect transistor (FET), which serves as a switching element for controlling electric current, a voltage detector, and passive elements such as a resistor and a capacitor. The PCM interrupts overcharge, overdischarge, overcurrent, short circuits, and reverse voltage of the battery to prevent the explosion or the overheating of the battery, the leakage of liquid from the battery, and the degradation of the charge and discharge characteristics of the battery, and to prevent the lowering of the electrical efficiency of the battery and the abnormal physicochemical behavior of the battery, thereby eliminating dangerous factors from the battery and increasing the service life of the battery.

Generally, the PCM is connected to the battery cell via a conductive nickel plate by welding or soldering. Specifically, the nickel plate is fixed to an electrode tap of the PCM by welding or soldering, and then the nickel plate is fixed to the electrode terminals of the battery cell by welding or soldering. In this way, the PCM is connected to the battery cell, whereby the battery pack is manufactured.

In this case, several welding or soldering operations are needed to manufacture the battery pack. However, these welding or soldering operations must be carried out with vary high accuracy since the structure of the secondary battery is small. As a result, the defective product rate is increased. Furthermore, the welding or soldering operations are added to the manufacturing process of the product, which increases the manufacturing costs of the product.

Consequently, a method of assembling the PCM and the battery cell without performing a spot welding or soldering process is seriously required. For this reason, much research on technologies for omitting the welding or soldering process has been carried out up to now.

For example, Korean Unexamined Patent Publication No. 2005-81175 discloses a battery pack including a PCM assembly, a cap housing for enclosing the PCM assembly, and electrode leads for electrical connection wherein a PCM block having a plurality of grooves, which communicate with the PCM assembly and the cap housing such that the electrode leads are exposed to the outside, is mounted to a battery cell.

Also, Korean Unexamined Patent Publication No. 2005-15314 discloses a battery pack wherein a printed circuit board (PCB) including a PCM and a protruding contact is mounted to a battery cell, and then the PCB is fixed to the battery cell by means of a fixing member.

The above-mentioned prior arts have advantages in that the welding or soldering process is omitted when the secondary battery is manufactured, whereby the assembly process of the battery is simplified, the number of components of the battery is decreased, and therefore, the manufacturing costs of the battery are reduced. However, the need of a battery pack that can be manufactured more economically and has increased manufacturing efficiency is still high.

SUMMARY OF THE INVENTION

Therefore, the present invention has been made to solve the above-mentioned problems, and other technical problems that have yet to be resolved.

Specifically, it is an object of the present invention to provide a battery pack wherein the assembly process of the battery pack is simplified, which enables the automatic manufacture of the battery pack, defectiveness and changes of internal resistance of the battery pack due to external impacts are minimized, the capacity of the battery is increased, and the stability of the battery pack is improved.

In accordance with the present invention, the above and other objects can be accomplished by the provision of a battery pack comprising: (a) a connecting member including an insulation frame mounted to the upper end of a battery cell and a pair of connection protrusions formed at the upper end surface of the frame, the connection protrusions being in contact with electrode terminals of the battery cell; (b) a protection circuit module (PCM) mounted to the connecting member, the PCM including connection grooves, into which the connection protrusions are inserted such that the PCM can be coupled to the connecting member, and which are connected to a protection circuit; and (c) a cap housing coupled to the connecting member or the battery cell while the PCM is surrounded by the cap housing.

The battery pack according to the present invention uses the connecting member, which has a novel structure that can be easily manufactured, whereby the manufacturing costs of the battery pack are reduced, the assembly process of the battery pack is further simplified, and the drawbacks caused due to welding or soldering are removed.

In a preferred embodiment, the connecting member includes an insulation plate-shaped body, and a pair of connection plates disposed at opposite ends of the plate-shaped body such that the connection plates are brought into contact with the corresponding electrode terminals of the battery cell, the connection protrusions being formed at the connection plates. When the connecting member is mounted between the battery cell and the PCM, the battery cell and the PCM are electrically isolated from each other by the insulation plate-shaped body, except specific regions of the connecting member, i.e., the connection plates, by the above-described structure of the connecting member.

The plate-shaped body and the pair of connection plates of the connecting member may be constructed in a separated structure. For example, the plate-shaped body may be provided at the opposite ends thereof with grooves, and the connection plates may be provided at the opposite end surfaces thereof with protrusions corresponding to the grooves, whereby the plate-shaped body is integrally coupled to the connecting plates by the engagement of the protrusions into the corresponding grooves.

To this end, the connection plates are coupled to the plate-shaped body and the PCM by means of the protrusions formed at the upper and lower end surfaces of the connection plates, and the plate-shaped body and the PCM are provided at regions where the plate-shaped body and the PCM are coupled to the connection plates, with connection grooves, which correspond to the protrusions.

The connecting member may be mounted to the battery cell in various manners. For example, the connecting member may be coupled to the battery cell using a fixing method in which the connecting member is fixed to the battery cell by a double-sided adhesive tape or a bonding agent, a fixing method in which the connecting member is fixed to the battery cell by welding or soldering, or a mechanical coupling method in which additional coupling members are mounted at the contact regions of the battery cell and the connecting member, or the contact regions of the battery cell and the connecting member are formed in a coupling structure.

In a preferred embodiment, the connecting member is provided at the middle thereof with a through-hole for allowing the protruding terminal formed at the upper end of the battery cell to be inserted therethrough. The protruding terminal and the connection plate are brought into contact with each other through the through-hole, whereby the electrical connection is accomplished.

According to the present invention, the cap housing is a member having a lower structure approximately corresponding to the upper end surface of the battery cell such that the cap housing is coupled to the battery cell while the PCM mounted to the upper end of the battery cell is mounted in the cap housing.

According to circumstances, the cap housing may be integrally formed with the PCM by insert injection molding. This integral structure is disclosed in Korean Patent Application No. 2003-88528, which has been filed in the name of the applicant of the present patent application. The disclosure of the above-mentioned Korean patent application is hereby incorporated by reference as if fully set forth herein.

The cap housing is provided with through-holes, through which external input and output terminals of the PCM are exposed while the PCM is mounted to the lower end surface of the cap housing. The cap housing is made of an insulating material, by which the cap housing is electrically isolated from the outside, except for the external input and output terminals.

Also, the cap housing may be mounted to the battery cell in various manners, which are similar to the above-mentioned mounting manners in which the connecting member is mounted to the battery cell. According to circumstances, the cap housing may be provided at the lower end thereof with a side extension, which partially covers the battery cell when the cap housing is mounted to the battery cell. Consequently, when a wrapping film is attached to the outer surface of the battery cell, the wrapping film is also attached to the side extension, whereby the mounting of the cap housing to the battery cell is accomplished.

The battery cell used in the present invention is a secondary battery having an electrode assembly, which comprises cathodes, anodes, and separators, impregnated in an electrolyte in a sealed state. Preferably, the battery cell may be a so-called rectangular battery having such an electrode assembly mounted in a rectangular metal case.

BRIEF DESCRIPTION OF THE DRAWINGS

The above and other objects, features and other advantages of the present invention will be more clearly understood from the following detailed description taken in conjunction with the accompanying drawings, in which.

Figure 1:
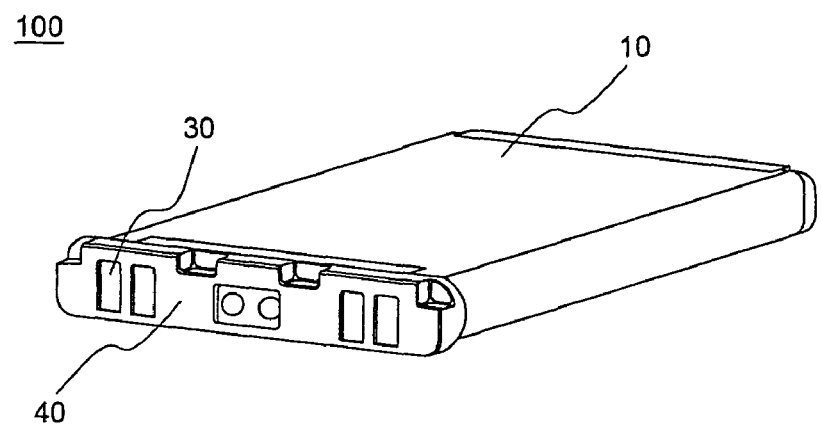
FIG. 1 is a perspective view illustrating a battery pack according to a preferred embodiment of the present invention.

| <Description of Main Reference Numerals of the Drawings> | |
|---|---|
| 10: battery cell | 20: connecting member |
| 30: PCM | 40: cap housing |

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 2:
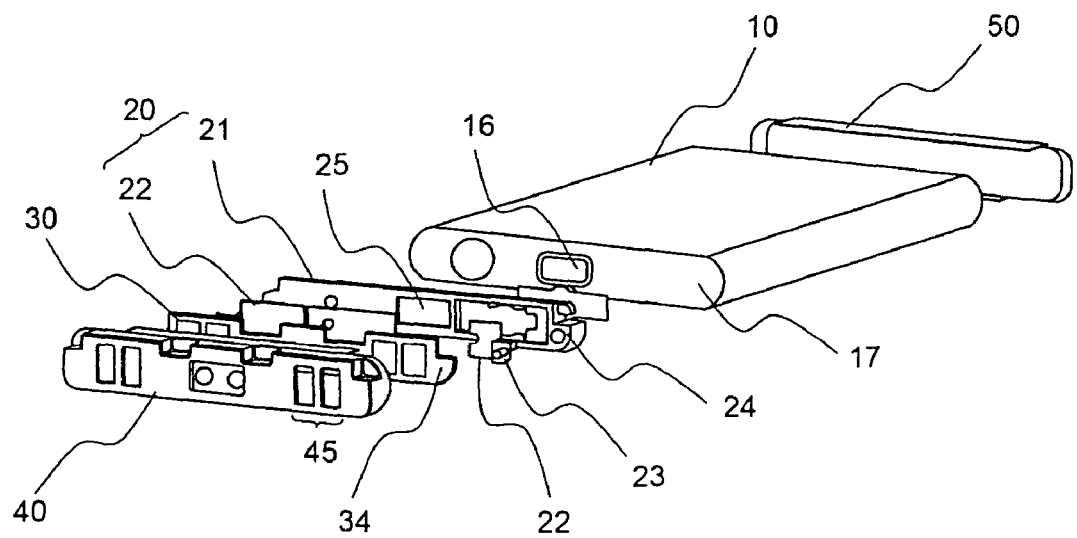
FIG. 2 is an exploded perspective view of the battery pack shown in FIG. 1.

FIG. 1 is a perspective view illustrating a battery pack according to a preferred embodiment of the present invention, and FIG. 2 is an exploded perspective view of the battery pack shown in FIG. 1.

Referring to FIGS. 1 and 2, the battery pack 100 includes a connecting member (not shown) mounted to the upper end of a battery cell 10, a protection circuit module (PCM) 30 mounted to the connecting member, a cap housing 40 coupled to the battery cell 10 while the PCM 30 is mounted in the cap housing 40, and a lower cap 50 mounted to the lower end of the battery cell 10.

The connecting member 20 is mounted to an upper end surface 17 of the battery cell 10, which constitutes a cathode (or an anode) and is provided at the middle thereof with a protruding terminal 16, which constitutes the anode (or the cathode).

The connecting member 20 includes an insulation plate-shaped body 21, which has a through-hole 25 formed in the middle thereof for allowing the protruding terminal 16 to be inserted therethrough, and connection plates 22, which are electrically connected to the respective electrode terminals 16 and 17 of the battery cell 10 and coupled to opposite ends of the plate-shaped body 21.

The insulation plate-shaped body 21 may be mounted to the upper end surface 17 of the battery cell 10 in various coupling manners. The mechanical coupling and the electrical connection between the insulation plate-shaped body 21 and the PCM 30 is accomplished by the connection plates 22.

Specifically, the connection plates 22 of the connecting member 20 are provided at the upper and lower end surfaces thereof with protrusions 23. The plate-shaped body 21 of the connecting member and the PCM 30 are provided with grooves 24 and 34, respectively, which correspond to the protrusions 23. Consequently, the coupling between the connecting member 20 and the PCM 30 is easily performed by the engagement of the protrusions into the corresponding grooves.

When the above-described coupling is performed, one-side parts of the connection plates 22 are brought into contact with the electrode terminals 16 and 17 of the battery cell 10. Consequently, the connection plates 22 also serve to electrically connect the battery cell 10 and the PCM 30 with each other. To the lower end surface of the PCM 30, which is in contact with the connection plates 22, is connected a protection circuit, and therefore, the electrical connection is naturally accomplished when the connection plates 22 and the PCM 30 are brought into contact with each other.

The cap housing 40 includes an open lower end having a structure corresponding to the upper end surface 17 of the battery cell 10 such that the cap housing 40 is coupled to the battery cell 10 by the connecting member 20 while the PCM 30 mounted to the battery cell 10 is mounted in the cap housing 40. Also, the cap housing 40 is provided with a plurality of through-holes 45, through which external input and output terminals of the PCM 30 are exposed.

Figure 3:
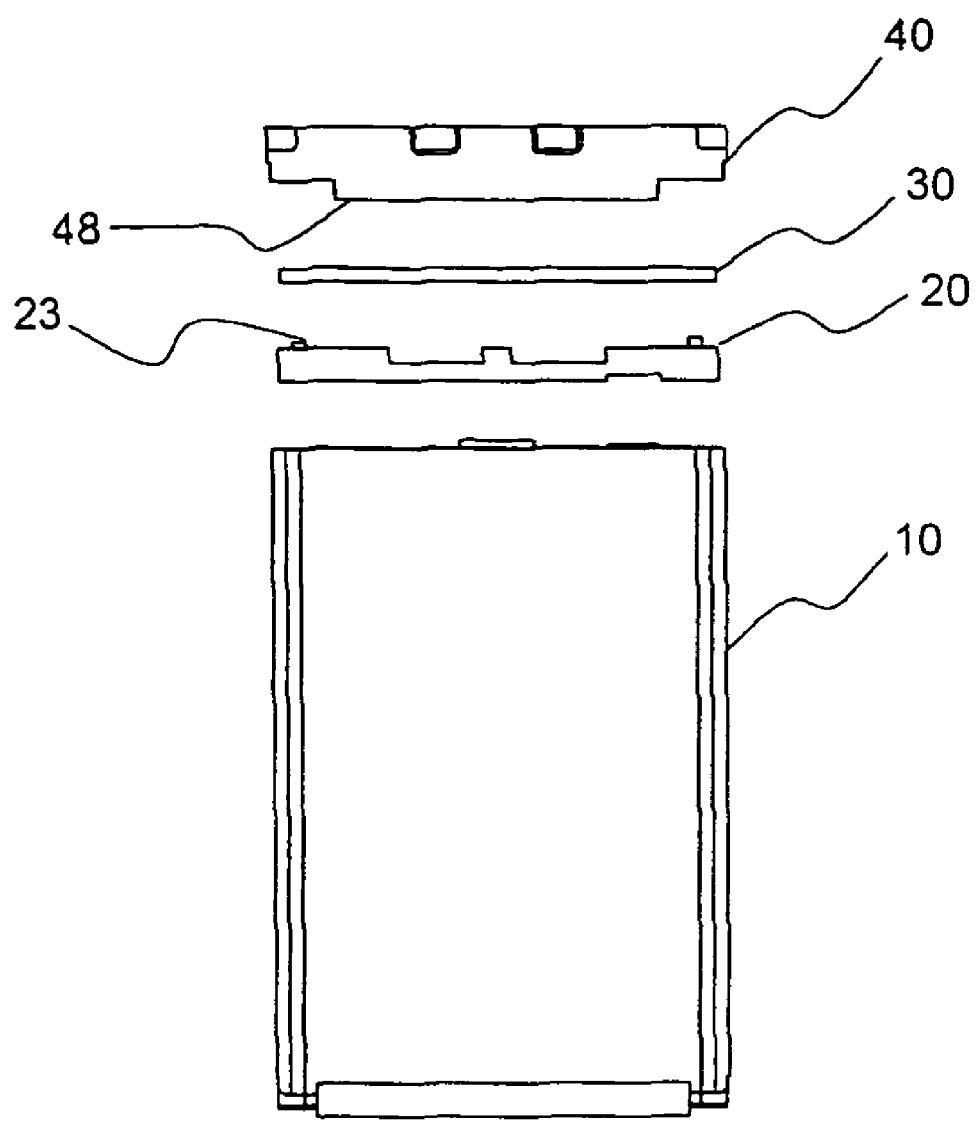
FIG. 3 is a plan view of the battery pack shown in FIG. 1.

FIG. 3 is a plan view of the battery pack shown in FIG. 1.

Referring to FIG. 3, the battery pack includes the battery cell 10, the connecting member 20, which is mounted to the battery cell 10 and is provided at the opposite ends thereof with the protrusions 23 for mechanical coupling and electrical connection, the PCM 30, which has the grooves (not shown) corresponding to the protrusions 23, and the cap housing 40, which is coupled to the battery cell 10 while the PCM 30 is mounted in the cap housing 40, as described above in detail with reference to FIGS. 1 and 2.

At the lower end of the cap housing 40 is formed a side extension 48, which extends toward the battery cell 10 such that the cap housing 40 can be easily coupled to the battery cell 10. The side extension 48 partially covers the battery cell when the cap housing 40 is mounted to the battery cell 10. Consequently, when a wrapping film is attached to the outer surface of the battery cell 10, the coupling force between the cap housing 40 and the battery cell 10 is increased.

Figure 4:
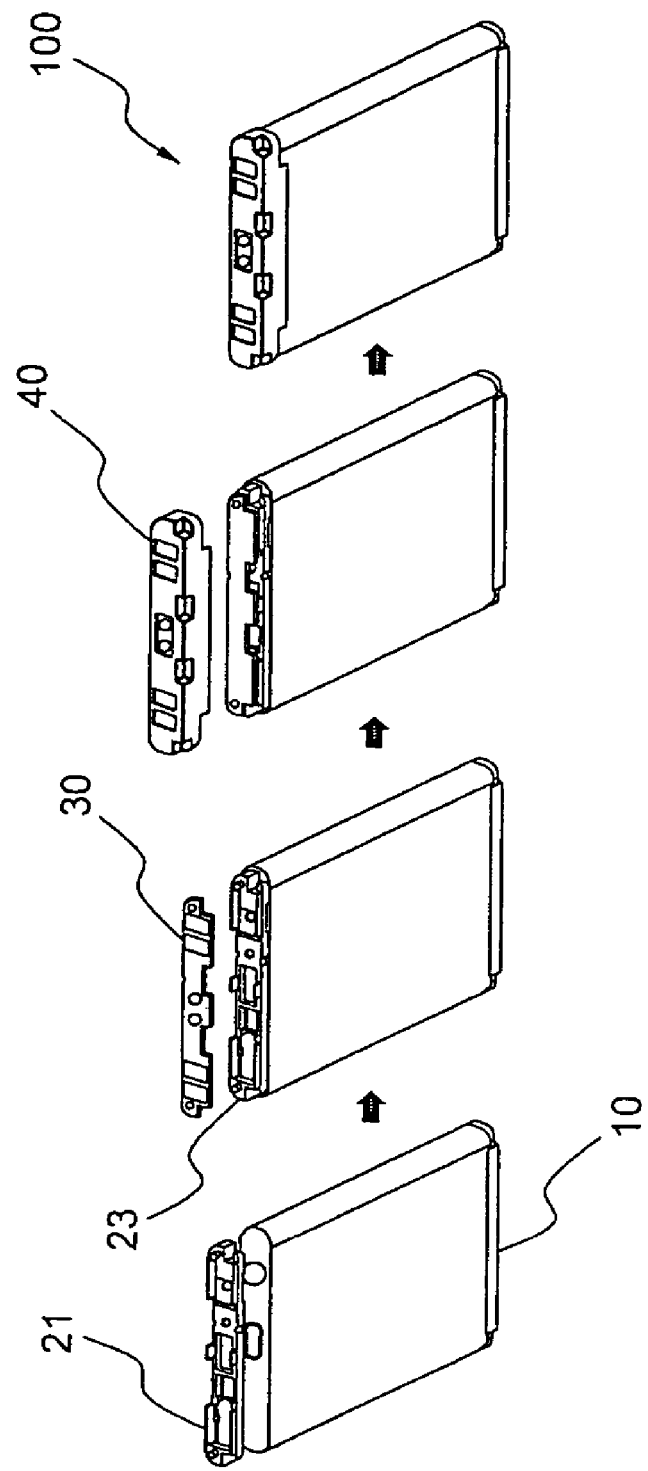
FIG. 4 is a perspective view typically illustrating a series of processes for assembling a protection circuit module (PCM) to a battery cell of the battery pack shown in FIG. 1 in a no-welding fashion.

FIG. 4 is a perspective view typically illustrating a series of processes for assembling a protection circuit module (PCM) to a battery cell of the battery pack shown in FIG. 1 in a no-welding fashion.

Referring to FIG. 4, the battery pack 100 is assembled as follows. First, a bonding agent is applied to the upper end of the battery cell 10 and/or the lower end of the connecting member 20, and then the battery cell 10 and the connecting member 20 are attached to each other, whereby the connecting member 20 is securely mounted to the battery cell 10. This attachment is accomplished between the plate-shaped body of the connecting member 20 and the battery cell 10.

Subsequently, the PCM 30 is mounted to the connecting member 20 such that the protrusions formed at the opposite ends of the connecting member 20, specifically, the protrusions 23 formed at the connection plates of the connecting member 20, are engaged into the corresponding grooves formed at the PCM 30, whereby the PCM 30 is securely coupled to the connecting member 20. This coupling between the PCM and the connecting member is accomplished by the engagement of the protrusions into the corresponding grooves, and therefore, the coupling between the PCM and the connecting member is very easily and simply accomplished. At this time, the protrusions 23 formed at the connection plates of the connecting member 20 are engaged into the corresponding grooves formed at the plate-shaped body. According to circumstances, a bonding agent may be applied to the interface between the plate-shaped body and the connection plates.

After that, the cap housing 40 is coupled to the upper end of the battery cell 10 such that the outer surface of the PCM 30 is covered by the cap housing 40, whereby the battery pack 100 is manufactured. According to circumstances, a wrapping film (not shown) may be attached to the outer surface of the battery cell 10.

The assembly processes of the battery pack 100 is not limited to the above-described assembly processes. For example, the assembly processes of the battery pack 100 may be carried out in a condition that the PCM 30 has been previously coupled to the connecting member 20 or the cap housing 40.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the no-welding type battery pack according to the present invention has effects in that the assembly process of the battery pack is simplified, which enables the automatic manufacture of the battery pack, defectiveness and changes of internal resistance of the battery pack due to external impacts are minimized, the capacity of the battery is increased, and the stability of the battery pack is improved.

What is claimed is:

1. A battery pack comprising:
   (a) a connecting member including a single, unitary insulation plate-shaped body which is mounted to an upper end of a battery cell and a pair of connection plates which are electrically connected to electrode terminals of the battery cell,
   wherein
   the connection plates are provided with upper connection protrusions and lower connection protrusions, the lower connection protrusions protruding towards the insulation plate-shaped body,
   and the insulation plate-shaped body is provided with grooves into which the lower connection protrusions are inserted such that the insulation plate-shaped body is coupled to the connection plates;
   (b) a protection circuit module (PCM) mounted to the connecting member, the PCM including connection grooves, into which the upper connection protrusions protruding towards the PCM are inserted such that the PCM can be coupled to the connecting member, and which are connected to a protection circuit; and
   (c) a cap housing coupled to the connecting member or the battery cell while the PCM is surrounded by the cap housing.

2. The battery pack according to claim 1, wherein the connecting member is coupled to the battery cell using a fixing method in which the connecting member is fixed to the battery cell by a double-sided adhesive tape or a bonding agent, a fixing method in which the connecting member is fixed to the battery cell by welding or soldering, or a mechanical coupling method in which additional coupling members are mounted at contact regions of the battery cell and the connecting member, or the contact regions of the battery cell and the connecting member are formed in a coupling structure.

3. The battery pack according to claim 1, wherein the connecting member is provided at a middle thereof with a through-hole for allowing a protruding electrode terminal of the electrode terminals of the battery cell to be inserted therethrough.

4. The battery pack according to claim 1, wherein the PCM is integrally formed with the cap housing by insert injection molding.

5. The battery pack according to claim 1, wherein the cap housing is coupled to the battery cell by adhesion, welding, soldering, or mechanical coupling while the PCM is mounted in the cap housing.

6. The battery pack according to claim 1, wherein a lower end portion of the cap housing has a side extension, and the side extension partially covers the battery cell when the cap housing is mounted to the battery cell, and, when a wrapping film is attached to an outer surface of the battery cell, the wrapping film is also attached to the side extension, whereby the mounting of the cap housing to the battery cell is accomplished.

* * * * *